INVENTORS.
ROBERT L. WILLIAMS
MURRAY D. NELSEN
HOWARD E. CORNER
CARL L. NORRIS
JAMES E. GOODBAR
IVAN L. OLIVER

BY Christensen, Sanborn, & Matthews
ATTORNEYS

INVENTORS.
ROBERT L. WILLIAMS
MURRAY D. NELSEN
HOWARD E. CORNER
CARL L. NORRIS
JAMES E. GOODBAR
IVAN L. OLIVER
BY
ATTORNEYS

May 16, 1967  C. L. NORRIS ETAL  3,319,569
FUEL FEEDING SYSTEMS
Original Filed Jan. 2, 1964  3 Sheets-Sheet 3

INVENTORS.
ROBERT L. WILLIAMS
MURRAY D. NELSEN
HOWARD E. CORNER
CARL L. NORRIS
JAMES E. GOODBAR
IVAN L. OLIVER
BY Christensen, Sanborn, & Matthews
ATTORNEYS 3,319,569
FUEL FEEDING SYSTEMS
Carl L. Norris, Huntsville, Ala., Robert L. Williams, Murray D. Nelsen, and Howard E. Corner, Wichita, Kans., James E. Goodbar, Huntsville, Ala., and Ivan L. Oliver, New Orleans, La., assignors to The Boeing Company, Seattle, Wash., a corporation of Delaware
Original application Jan. 2, 1964, Ser. No. 335,236. Divided and this application Dec. 14, 1965, Ser. No. 528,012
4 Claims. (Cl. 103—5)

This is a divisional application of copending patent U.S. patent application Serial Number 335,236, filed Jan. 2, 1964, for "Fuel Feeding Systems."

This invention relates to fuel feeding systems, and more particularly relates to fuel feeding systems for aircraft.

Conventional aircraft fuel feeding systems have heretofore utilized one or more centrifugal boost pumps located within fuel tank means in an aircraft. The centrifugal boost pumps supply fuel to aircraft engine fuel pump means.

An engine driven fuel pump usually has two stages, the first stage being of a centrifugal type and the second stage being of a positive displacement type. The tank mounted boost pump is required to prevent engine pump failure due to cavitation at altitude. The fuel boost pump must be sized to maintain required positive pressure at the engine driven pump inlet during all flight conditions of the aircraft and for all engine throttle settings.

An impeller of a centrifugal pump, such as is usually used as a tank mounted fuel boost pump, is characterized by high impeller tip speeds. High impeller tip speeds cause localized areas of low static pressure which can become so low as to permit the vaporization of a liquid, such as highly volatile jet fuel. This vaporization phase causes fluctuations in pump performance and reduces fuel output pressure. This phenomenon is usually termed cavitation. If pump cavitation is to be prevented due to high fuel temperature and/or high altitudes, some form of tank pressurization must be employed and/or additional power is required for driving the pump. Accordingly, there is a deterioration of boost pump performance with an increase in fuel temperature and/or altitude.

Most large or high performance aircraft presently use centrifugal pumping systems for engine fuel feed and transfer purposes. A principal type of centrifugal pumping system employs electrical motor driven pumps powered with electricity from a constant speed alternator. Other systems utilize hydraulic and pneumatic turbine driven pumps. These systems have a history of malfunctioning and excessive maintenance and therefore cannot achieve a high degree of mission reliability. Accordingly, aircraft utilizing these systems must have dual systems. This often results in use of a combination of different types of centrifugal pumping systems, which require an excessive amount of secondary power.

This invention contemplates the use of ejector pumps in a fuel feeding system for reducing the number of moving parts by the elimination of centrifugal boost pumps, and thereby providing a major improvement in aircraft fuel feeding systems.

This invention further contemplates the use of available fuel from an engine driven pump to drive engine feed and auxiliary tank ejectors. The invention eliminates the tank mounted centrifugal fuel boost pumps through utilization of power available from engine driven fuel pump means.

In general, the present invention provides in the fuel tank of on airplane a first ejector pump, from which fuel flows through a fuel line to a two-stage pump, which in turn feeds the fuel to the airplane engine. There is a booster feedback line leading from the two-stage pump back to the ejector pump to boost pressure in the fuel line. There is a second ejector pump in the booster line and there is a second booster line leading from an afterburner pump to said second ejector pump to increase pressure in the first feedback line, this arrangement improving the performance of the fuel feeding system.

It is an object of this invention therefore, to provide novel aircraft fuel feeding systems employing ejector pumps and thereby reducing the number of moving parts through the use of ejector pumps for fuel boost and/or transfer purposes. Ejector pumps do not have moving parts that wear out nor do they have lubrication or overheat problems generally associated with a centrifugal type pump and therefore do not require the maintenance procedures associated with centrifugal pumps. The ejector pumps require no wiring, cockpit controls, or circuit breakers, and accordingly eliminate the usual fire hazards associated with electrical boost pumps.

Another object of this invention is the provision of a novel aircraft fuel feeding system employing ejector boost pumps that are simple and reliable. Since an ejector boost pump depends upon an engine driven pump for operation and the engine also depends on the engine driven pump for operation there is no necessity for an auxiliary electrical system for driving a centrifugal boost pump from an external power supply. This lends simplicity and reliability to the invention.

Another object of this invention is the provision of a novel aircraft fuel feeding system utilizing ejector boost pumps positioned in such a manner as to make a maximum amount of fuel in the tanks available for use. Generally, a centrifugal boost pump cannot, at rated performance, pump the last several inches of fuel in a tank mounted installation thereof.

Yet another object of this invention is the provision of a novel fuel feeding system utilizing ejector fuel pumps in such a manner that ejector pump performance increases with altitude since fuel flow required by an engine is reduced by an increase in altitude, and accordingly more fuel is made available as primary flow for operating the ejector boost pumps. In contradistinction thereto the outputs of centrifugal boost pumps decay with altitude because ambient pressure is reduced with an increase in altitude. Accordingly, the fuel boost pressure rises required by the engine pump become greater in order to sustain the minimum pump inlet pressure of the centrifugal boost pump. Normally the fuel required by an engine driven pump for supplying fuel to an engine is essentially constant for a given engine speed regardless of altitude. Thus at an altitude where the engine demands less fuel flow, the excess power necessary for pumping is converted into heat. In a system utilizing ejector boost pumps this power is used for pumping and therefore is not completely converted into heat. However, this excess power is not utilized in a centrifugal boost pump system. Also additional power is required for the centrifugal boost pumps. The ejector system therefore is more efficient since no additional power is required for boost. The ejector system is less costly because of its simplicity. Moreover, there is a saving of weight.

Another object of this invention is the provision of a novel aircraft fuel feeding system, utilizing ejector pumps for engine fuel feeding and intertank transfer purposes, having many advantages over conventional centrifugal type boost pumping systems through the reduction of maintenance, secondary power requirements, weight, or cost, and/or by improved reliability and safety.

The invention further resides in certain novel features of construction, combinations, and arrangements of parts, and further objects and advantages of the invention will be apparent to those skilled in the art to which it pertains from the following description of the present preferred embodiments thereof described with reference to the accompanying drawings, which form a part of this specification, wherein the same reference numerals indicate corresponding parts throughout the several views, and in which.

Figure 1:
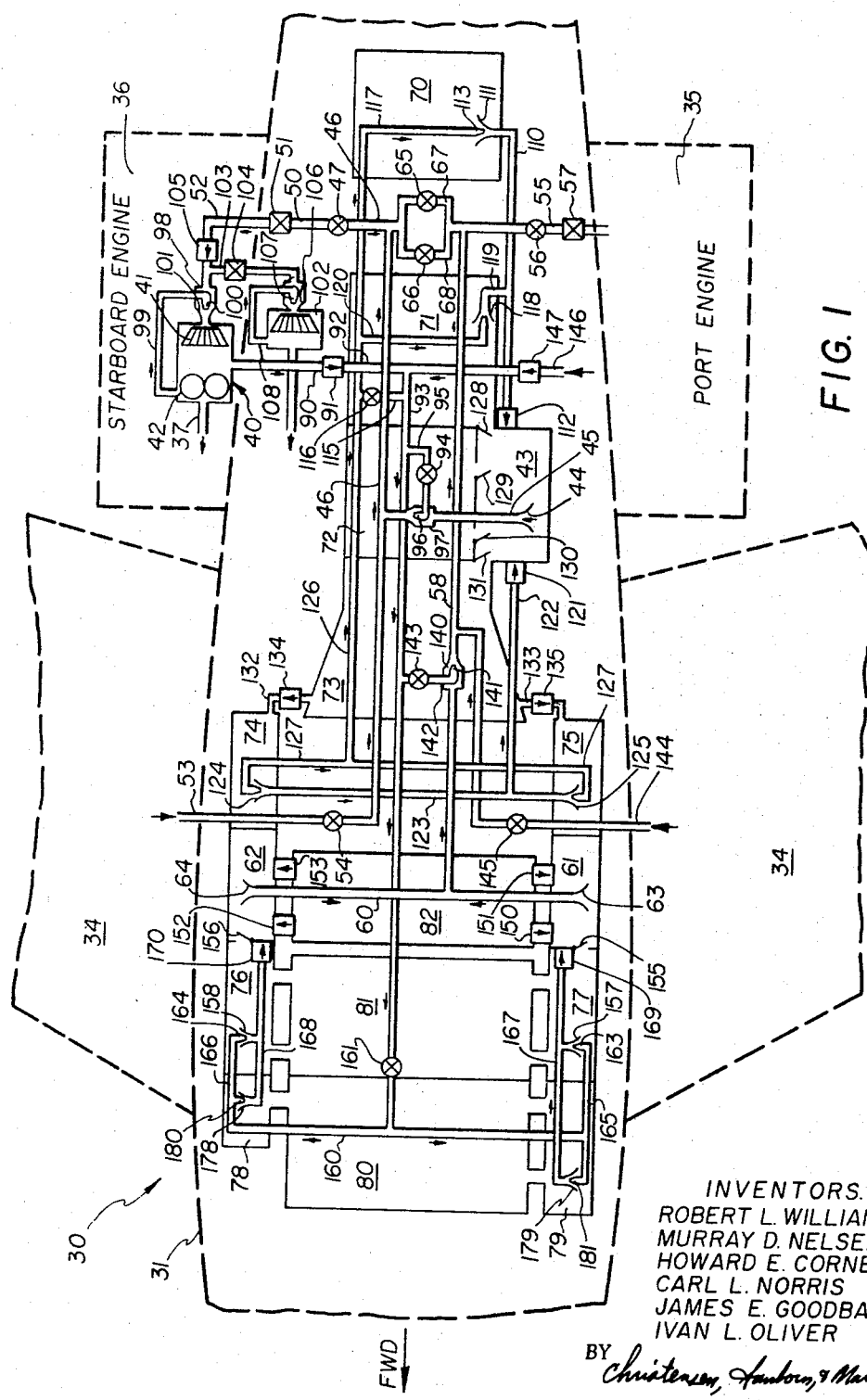
FIG. 1 is a schematic diagram in plan view of a fuel storage, transfer, and feeding system for a high performance aircraft preferably having two engines with afterburners and embodying the invention.

It is to be understood that the invention is not limited to the details of construction and the arrangements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, an aircraft indicated generally by the reference numeral 30 comprises a fuselage 31, variable swept wings 34, and an empennage, not shown. In its preferred form, the invention provides new fuel transfer and feeding systems and includes subsystem modifications embodying the invention suited for use on an aircraft having one or more engines. The aircraft 30 is shown with two engines 35 and 36. However, the subsystems will be described in relation to the starboard engine 36 only, since the subsystems for the port engine 35 may be considered substantially the same.

Referring to the engine 36, fuel is pumped to burners therein, not shown, through a fuel line 37 by means of a two-stage pump, indicated generally by the reference numeral 40. The pump 40 has a centrifugal pump first stage 41 and a positive displacement gear pump second stage 42. The pump 40 draws fuel from a main sump 43 via an intake eductor 44, a main branch line 45, a line 46, through a fire shutoff valve 47 in a line 50, a shutoff valve 51 in a line 52 to the intake side of the centrifugal first stage pump 41. The line 46 is also connected via a line 53 to conduct fuel from the starboard wing 34. The line 53 has a motor operated, manual override valve 54 therein. A two-stage pump, similar to the pump 40 and which is not shown, is attached to a line 55 having a fire shutoff valve 56 therein and a motor operated, manual override valve 57 therein. Primarily, the port engine 35 draws fuel via the line 55, a main feed line 58, a cross feed line 60, from a port sump 61 and a stardboard sump 62. The opposite ends of the line 60 have eductors 63 and 64 attached thereto.

It is to be understood that the eductors 44, 63, and 64 are preferably disposed closely facing parallel to the bottom of each of the sumps 43, 61, and 62 respectively. However, the aductors 44, 63, 64 are roughly schematically illustrated as located in their respective sump tanks without any particular orientation being precisely illustrated since such orientation can be varied as desired. One of the advantages of using eductors 44, 63 and 64 in this manner is that most of the fuel can be drawn from the sumps 43, 61, and 62, respectively, during normal flight attitude and thus reduce fire hazard. This also provides greater economy of operation of the aircraft with all the attendant advantages thereof.

The lines 55 and 50 have parallel cross feed valves 65 and 66 in interconnecting parallel lines 67 and 68 respectively, for permitting the desired cross feed of fuel between the main supply lines 46 and 58 to the two engines 36 and 35, respectively. In addition to the main fuel tanks in the wings 34 and the fuselage sumps 43, 61, 62, additional tanks 70, 71, 72, 73, 74, 75, 76, 77, 78, 79, 80, 81 and 82 are provided.

An ejector pump nozzle feedback line 90 is connected to the first stage 41 of the two-stage pump 40 and conducts fuel under pressure therethrough via a check valve 91, a line 92, a main line 93, and a motor operated, manual override valve 94 in a branch line 95, to an ejector 96 of an ejector pump 97 in the main branch line 45. The ejector pump 97 boosts the pressure in the main fuel line 46 that leads to the pump 40.

Referring to the engine 36 in FIG. 1, an additional boost in pressure is provided to relieve the pump 40 by a feedback to an ejector pump 98 in the line 52. The pump 98 is adjacent to or at the intake side of the first stage 41 of the pump 40. Fuel is fed from the discharge side of the positive displacement second stage 42 of the pump 40 via a line 99 to a nozzle 100 of the ejector pump 98. The pump 98 has an eductor 101 in the line 52. The two ejector pumps 97 and 98 are lightweight in construction and eliminate the necessity for electrically driven auxiliary boost pumps in the fuel tanks, and efficiently utilize excess displacement and power of the two-stage pump 40.

A single stage centrifugal afterburner pump 102 has an intake port thereof connected via a line 103 to the line 52 for supplying fuel to an afterburner, not shown, of the engine 36. Preferably a shutoff valve 104 is located in line 103, also a one-way check valve 105 is located in the line 52 immediately up-stream of the connection of the line 103 with the line 52. Preferably the line 103 is connected up-stream of the ejector pump 98 in the embodiment of FIG. 1. Fuel is supplied through the line 103 to the afterburner pump 102 and is boosted along by an ejector pump having an eductor 106 connected into the line 103 adjacent to the pump 102. An ejector pump nozzle 107 is operatively disposed in the eductor 106 and is supplied with fuel under pressure from the pump 102 via a feedback line 108.

Due to the inherent instability and imbalance problem caused by a shift in the center of gravity of a variable sweep wing aircraft and also in view of the well known fuel sloshing problem in a high performance type military aircraft, it is necessary to have a large number of fuel tanks, both in the wings and in the fuselage. The fuel tanks may be referred to as separate and distinct or discrete tanks, sump tanks, and transfer tanks. However it is to be understood that these tanks can be combined or baffled and otherwise varied generally in accordance with the state-of-the-art. For example, fuel is pumped from the auxiliary tank 70 located in the aft portion of the fuselage 31 via a transfer line 110 having an eductor 111 at the intake end thereof in the tank 70 and having the other end thereof supplying fuel to the main pump 43 via a one-way check valve 112 at the discharge end of the line 110.

An ejector nozzle 113 has its discharge end in operative arrangement with the eductor 111 for forming an ejector pump within the fuel tank 70. The main feedback line 90 supplies fuel under pressure to the nozzle 113 of the ejector pump via the check valve 91, the line 92, a cross feed line 115 having a motor operated, manual override valve 116 therein, and a feedback line 117.

The transfer line 110 has the fuel pressure therein boosted by means of an auxiliary ejector pump 118 in the auxiliary fuel tank 71. The ejector pump 118 comprises an eductor with a nozzle therein. The intake end of a line 119 is connected to the eductor of the pump 118 and feeds fuel to the transfer line 110. The nozzle of the pump 118 is connected to a line 120. The line 120 is connected to the feedback line 117 between the nozzle 113 in the tank 70 and the cross feed line 115 in the tank 71.

Fuel is also pumped into the main sump tank 43 by way of a check valve 121 in a fuel transfer line 122 connected to a cross feed line 123 for drawing fuel from the auxiliary tanks 74 and 75. The tanks 74 and 75 are respectively located in the starboard and port sides of the fuselage 31 near the trailing roots of the wings 34. The cross feed line 123 has ejector pumps 124 and 125 at the opposite ends thereof in the tanks 74 and 75 respectively. The nozzles of the ejector pumps 124 and 125 are supplied with fuel under pressure from the feedback lines 90, 92, 115 and then via a feedback line 126 and a cross feed feedback line 127.

Auxiliary tanks 71, 72 and 73 dump fuel into the sump 43 by means of flap valves 128, 129 and 130, and 131, respectively. Additionally the auxiliary tank 73 continuously replenishes fuel in the auxiliary sump tanks 74 and 75 via lines 132, 133 having check valves 134 and 135 therein, respectively. The check valves 134 and 135 prevent the reverse flow of fuel from auxiliary sump tanks 74 and 75 into the auxiliary tanks 73.

The auxiliary sump tanks 61 and 62 supply fuel respectively via eductors 63 and 64 through the cross feed line 60 and the main port engine fuel feed line 58 to the port engine 35 via the line 55, the pump 40, and the line 57; or simultaneously therewith via the cross feed lines 67, 68 and the lines 50 and 52 to the pump 40 of the starboard engine 36.

The pressure in the main port side feed line 58 is preferably boosted by means of an ejector pump 140 therein from the main feedback line 93. The ejector pump 140 has a nozzle 141 therein receiving feedback fuel from the main feedback line 93 via a branch feedback line 142 having a motor operated, manual override valve 143 therein. The main port side line 58 also draws fuel from the port wing via a lead line 144 having a motor operated, manual override valve 145 therein. The line 144 is connected to the line 58 downstream of the ejector pump 140. The port engine 35 assists the starboard engine 36 in supplying feedback line pressure to the main feedback line 93 via line 146 having a one-way valve 147 therein.

The sumps 61 and 62, from which the port side engine 35 chiefly draws its fuel, are continuously supplied from the auxiliary tank 82 respectively via one-way check valves 150, 151, and 152, 153.

Although the sumps 61 and 62 are additionally supplied with fuel from the tanks 77 and 76, respectively, via dump valves 155 and 156, provision is made for pumping fuel thereto by means of ejector pumps 157 and 158 located in the tanks 77 and 76, respectively. The main pressure feedback line 93 is connected to a cross feed line 160 as controlled by a motor operated, manual override valve 161 located in the line 93. Ejector nozzles 163 and 164 of the pumps 157 and 158 are connected to the opposite ends of the cross feed line 160 via lines 165 and 166, respectively. The pumps 157 and 158 respectively discharge through lines 167 and 168 and one-way check valves 169 and 170 into the sump tanks 61 and 62.

The auxiliary tanks 76 and 77 have common connections with the larger auxiliary tank 81. Similarly the auxiliary tanks 78 and 79 have common connections with the larger auxiliary tank 80. Fuel in the tanks 78 and 79 is transferred to the sump tanks 62 and 61, respectively, by means of ejector boost pumps comprising eductors 178, 179 and nozzles 180, 181, respectively. The eductor 178 is connected to one end of the transfer line 168. The nozzle 180 is connected into the same cross feed line 160 by means of the branch line 166, the same as the nozzle 164. The eductor 179 is connected to one end of the transfer line 167. The nozzle 181 is connected to the branch feedback line 165.

Basically then the port engine 35 draws fuel from the sumps 61 and 62. Sumps 61 and 62 are automatically continuously supplied with fuel from the auxiliary tanks 76, 77, 81 and 82. The auxiliary tanks 78, 79, and 80 are used to supply the sumps 61 and 62 only, and this occurs only when the valve 161 is opened. The fuel pressure in the port engine's main feed line 58 is increased when the feed line ejector pump 140 is put into operation by opening the valve 143. If necessary, the fuel supply to the port engine 35 can be shut off by simply closing the valve 57.

The starboard engine 36 draws its fuel from its main sump tank 43. The tank 43 is automatically continuously supplied with fuel from the tanks 71, 72, and 73. Ejector pumps in the auxiliary tanks 70, 71, 74 and 75 feed fuel to the sump 43 only when the valve 116 is open. The pressure in the starboard engine's main feed line 46 is boosted by the main feed line ejector pump when the valve 94 is open.

The tanks in the port and starboard wings 34 supply fuel to the lines 58 and 46 only when the valves 145 and 54 are opened. In case of fire, fuel to the engines 35 and 36 is cut off by closing fire valves 56 and 47.

Figure 2:
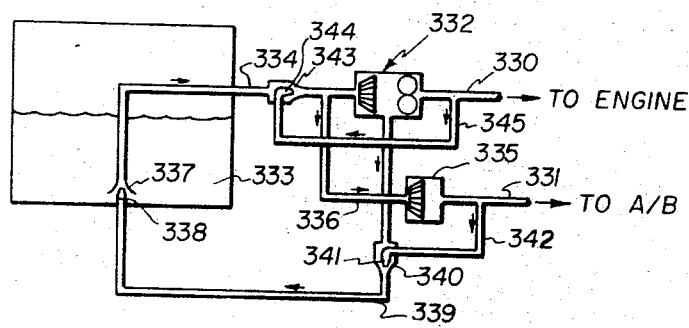
FIGS. 2, 3 and 4 are schematic diagrams of fuel feeding subsystems of this invention.

Referring to FIG. 2, a subcombination or subsystem of FIG. 1 is illustrated. An aircraft engine and an aircraft engine afterburner are supplied with fuel from pump discharge lines 330 and 331, respectively. A two-stage pump, indicated generally by reference numeral 332, draws fuel from a tank 333 by means of an intake line 334 and discharges throguh the line 330 to the aircraft engine. A single stage centrifugal pump 335 draws fuel from the intake line 334 by means of an intake branch line 336 and discharges to the aircraft afterburner by way of the discharge line 331. An ejector pump disposed in the fuel tank 333 comprises an eductor 337 and a nozzle 338. The eductor 337 is connected to an intake end of the line 334. The nozzle 338 is supplied with fuel under pressure from the first stage of the pump 332 means of a feedback line 339. The pressure in the line 339 is boosted by means of a second ejector pump comprising an eductor 340 in the line 339 and a nozzle 341 supplied with fuel from the afterburner pump discharge line 331 by means of a feedback line 342. The pressure of the fuel supplied to the pump 332 by means of the line 334 is boosted by means of a third ejector pump having an eductor 343 and an ejector nozzle 344. The eductor 343 is connected into the line 334 up-stream of the line 336. The nozzle 344 of the ejector pump is supplied with fuel from the two-stage pump discharge line 330 by means of a feedback line 345.

Figure 3:
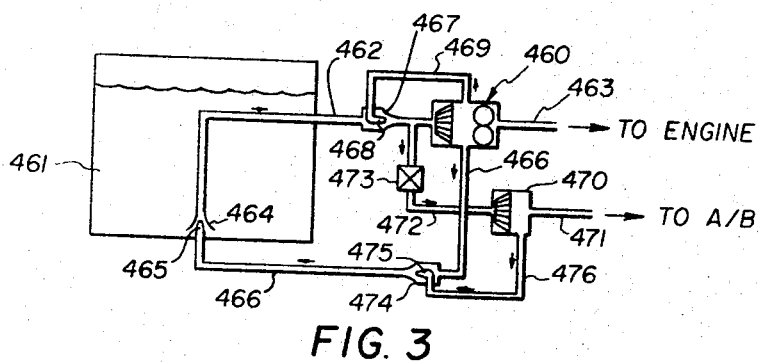

In FIG. 3, a two-stage pump indicated generally by the reference numeral 460, draws fuel from a fuel tank 461 by way of an intake line 462. The two-stage pump 460 has a centrifugal first stage and a constant displacement second stage that discharges fuel to an engine by way of a discharge line 463. Pressure in the fuel intake line 462 is boosted by means of an ejector pump comprising an eductor 464 and a nozzle 465. The eductor 464 is connected to an intake end of the intake line 462. The nozzle 465 is supplied with fuel from the first stage of the two-stage pump 460 by means of a feedback line 466. Fuel pressure in the line 462 is boosted by means of a second ejector pump comprising an eductor 467 and a nozzle 468. The eductor 467 is connected into the line 462. The nozzle 468 is supplied with fuel under pressure from the first stage of the two-stage pump 460 by means of a feedback line 469.

A centrifugal pump 470 in FIG. 3, supplies fuel via a line 471 to an afterburner. Pump 470 has an intake line 472 with a shutoff valve 473 therein. The intake end of the line 472 is connected to the main fuel line 462 between the eductor 467 and the pump 460.

A third ejector boost pump in FIG. 3, has an eductor 474 and a nozzle 475. The eductor 474 is connected into the main feedback line 466. The nozzle 475 is supplied with fuel under pressure from the discharge side of the afterburner pump 470 by way of a feedback line 476. Both the two-stage engine pump and the single stage afterburner pump each cooperate to operate one or more ejector pumps for supplying fuel from the fuel tank 461 into a main fuel line 462.

Figure 4:
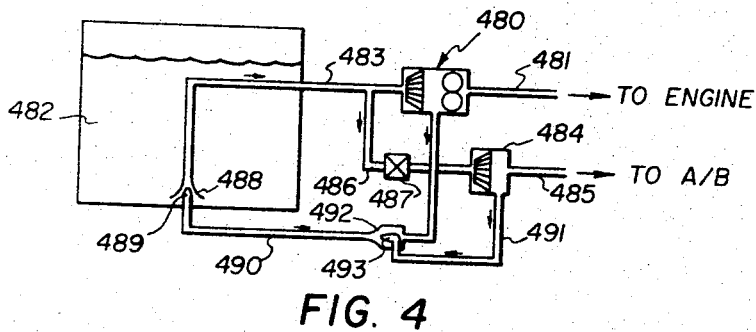

Referring to FIG. 4, a two-stage pump indicated generally by the reference numeral 480, discharges fuel to an engine by way of a discharge line 481 and draws fuel from a supply tank 482 by way of a main fuel line 483. The two-stage pump 480 preferably has a centrifugal first stage and a constant displacement second stage. Fuel to an afterburner is supplied by way of a centrifugal pump 484 through a discharge line 485. The pump 484 draws fuel from the line 483 by way of an intake line 486 having a shutoff valve 487 therein. Pressure in the main fuel line 483 is boosted by means of an ejector pump comprising an eductor 488 and a nozzle 489. The eductor 488 is affixed to the intake end of the line 483. The nozzle 489 is supplied with fuel under pressure from the first stage of the two-stage pump 480 by means of a feedback line 490. The centrifugal pump 484 supplies fuel under pressure to an ejector pump in the main feedback line 490 by way of a secondary feedback line 491. The second ejector pump comprises an eductor 492 and a nozzle 493. The eductor 492 is connected into the feedback line 490 and the nozzle 493 is connected to and receives fuel by way of the feedback line 491.

We claim:

1. A fuel feeding system for an aircraft engine comprising, a fuel tank, first ejector pump means having first eductor means with first nozzle means therein disposed in said fuel tank, a two-stage pump having an intake line and an outlet line, said pump being located externally of said fuel tank, said pump intake line being connected to said first eductor means, and a first pressure boost feedback line connecting the first stage of said pump to said first nozzle means for boosting the pressure in said pump intake line, second ejector pump means having second eductor means with second nozzle means therein and operatively disposed in said pump intake line, a second pressure boost feedback line having one end thereof connected to one of said stages of said two-stage pump and having another end thereof connected to said second nozzle means of said second ejector pump means in said pump intake line, a fuel feed line having an intake end in said pump intake line between said second ejector pump means and said pump and having another end thereof adapted to be connected to an afterburner for supplying fuel thereto, an afterburner pump in said afterburner fuel feed line and having an intake side and a discharge side, third ejector pump means having third eductor means with third nozzle means therein in said first pressure boost feedback line, and a third pressure boost feedback line having an intake end connected into said afterburner fuel feed line on said discharge side of said afterburner pump and having another end thereof connected to said third nozzle means of said third ejector pump means for assisting said two-stage pump in pumping fuel to said first nozzle means.

2. A fuel feeding system as set forth in claim 1, wherein said intake end of said second pressure boost feedback line is connected into the first stage of said two-stage pump.

3. A fuel feeding system as set forth in claim 1, wherein said intake end of said second pressure boost feedback line is connected into the outlet line of said two-stage pump.

4. A fuel feeding system for an aircraft engine comprising, a fuel tank, first ejector pump means having first eductor means with first nozzle means therein disposed in said fuel tank, a two-stage pump having an intake line and an outlet line, said pump being located externally of said fuel tank, said pump intake line connected to said first eductor means, a first pressure boost feedback line connecting the first stage of said pump to said first nozzle means for boosting the pressure in said pump intake line, a fuel feed line having an intake end in said pump intake line and having another end thereof adapted to be connected to an afterburner for supplying fuel thereto, an afterburner pump in said afterburner fuel feed line and having an intake side and a discharge side, second ejector pump means having second eductor means with second nozzle means therein in said first pressure boost feedback line, and a second pressure boost feedback line having an intake side connected to the discharge side of said afterburner pump and having another end connected to said second nozzle means of said second ejector pump means.

References Cited by the Examiner

UNITED STATES PATENTS

| | | | |
|---|---|---|---|
| 1,930,064 | 10/1933 | Schmidt | 60—95 |
| 2,435,982 | 2/1948 | Samiran et al. | 158—36 |
| 2,660,232 | 11/1953 | Noon et al. | 103—5 |
| 2,823,613 | 2/1958 | Leduc | 103—5 |
| 3,062,149 | 11/1962 | Jacuzzi | 103—5 |

FREDERICK L. MATTESON, JR., *Primary Examiner.*

R. A. DUA, *Assistant Examiner.*